United States Patent

McWhorter

[11] 3,861,239
[45] Jan. 21, 1975

[54] INTERNAL COMBUSTION ENGINE COMBUSTION CONTROL CRANKSHAFT

[76] Inventor: Edward M. McWhorter, 6931 Greenbrook Cir., Citrus Heights, Calif. 95610

[22] Filed: June 5, 1972

[21] Appl. No.: 259,958

[52] U.S. Cl. .................. 74/602, 74/393, 123/48 B, 123/78 E, 123/78 F, 123/197 AC
[51] Int. Cl. ............................................. F16c 9/04
[58] Field of Search ............ 74/602, 601; 123/48 B, 123/78 E, 78 F, 197 AC

[56] References Cited
UNITED STATES PATENTS

| | | | |
|---|---|---|---|
| 1,163,832 | 12/1915 | Lanchester | 74/604 |
| 2,199,625 | 5/1940 | Fiala-Fernbrugg | 123/78 F X |
| 2,369,747 | 2/1945 | Munn | 74/602 X |
| 3,686,972 | 8/1972 | McWhorter | 74/602 |

Primary Examiner—Samuel Scott
Assistant Examiner—F. D. Shoemaker

[57] ABSTRACT

A crankshaft for internal combustion engines comprising a plurality of crank throws whose crank radii are made to vary throughout the crankshaft revolution. In this invention a rotating eccentric is placed between the connecting rod and crankpin of each crankthrow. The eccentrics are rotated relative to the motion of the crankshaft by a gear and pinion system engaged with a gear belt or a sprocket and chain drive system. Rotation of the eccentric may be clockwise or counter clockwise depending on the arrangement of gears used to generate either epicycloidal or hypocycloidal motion. Rotation of the eccentrics varies the effective centerline to centerline distance of each crank throw in a manner relative to the motion of the engine piston resulting in more efficient combustion and more efficient mechanical utilization of the combustion gases during the power cycle.

3 Claims, 4 Drawing Figures

PATENTED JAN 21 1975  3,861,239

INTERNAL COMBUSTION ENGINE COMBUSTION CONTROL CRANKSHAFT

SUMMARY OF THE DISCLOSURE

The invention is a crankshaft to be used in the internal combustion engine comprising a plurality of crank throws whose crank radii are made to vary throughout the crankshaft revolution by an eccentric placed between the crankpin and the connecting rod. When the eccentric is rotated upon the crankpin the connecting rod is caused to rise or fall independently of, the uniform motion induced by the revolution of the crankpin. The crankshaft and the crankpin eccentric are interconnected by four gears in which there are two matching non-circular gears and two matching gear belt pulleys or sprocket gears. The said matching gear belt pulleys or sprocket gears being of any desired fixed ratio of diameters and said matching non-circular gears having a variably changing ratio of diameters as determined by analysis of combustion and crakshaft system dynamic requirements.

The mechanism presented may be used to regulate combustion pressures and temperatures during the power stroke. Combustion pressures are maintained at essentially higher levels for the first 90° of crank revolution to promote conditions more favorable for complete burning. This is accomplished by rotating the eccentric under the connecting rod in such a manner as to cause the piston to rise against the combustion pressure while the revolution of the crankshaft is causing the piston to drop. After 90° of crank travel the combustion pressure is dropped rapidly to produce lower final temperatures at sufficiently ample exhust gas residence time and thus obtain a corresponding decrease in the formation of nitrogen oxides. This is accomplished by rotating the eccentric under the connectng rod in such a manner to cause the piston to drop in conjunction with the motion imposed by the revolutuion of the crankshaft.

It is therefore the object of the present invention to provide in a manner as hereinafter set forth a crankshaft of the aforementioned character comprising a means of controlling piston speed within some measure relative to the uniform speed of the crankpin allowing combustion to proceed in a manner which will be benificial in the reduction of harmful exhaust emissions.

It is another object of the present invention to provide a variability within the crankshaft system described to allow its use in engines which operate on the Diesel cycle principle or on the Otto cycle principle without loss of thermodynamic efficiency within either system.

It is yet another object of the present invention to provide a means of decreasing the size of the associated gear train components by a unique method of constructing the crank arms.

It is yet another object of the present invention to provide a system which can use a combination of directly engaged non-circular gears and indirectly belt or chain engaged gear systems.

Various other possible objects and advantages of the present invention will become apparent to those skilled in the art from the description to follow which discusses in detail the particular preferred embodiments and should not be taken as limiting the true scope of the invention as set forth in the appended claims.

BRIEF DESCRIPTION OF THE DRAWINGS

There are included a s part of the specification drawings illustrative of the invention and briefly described as follows.

DESCRIPTION OF THE PREFERRED EMBODIMENT

Figure 1:
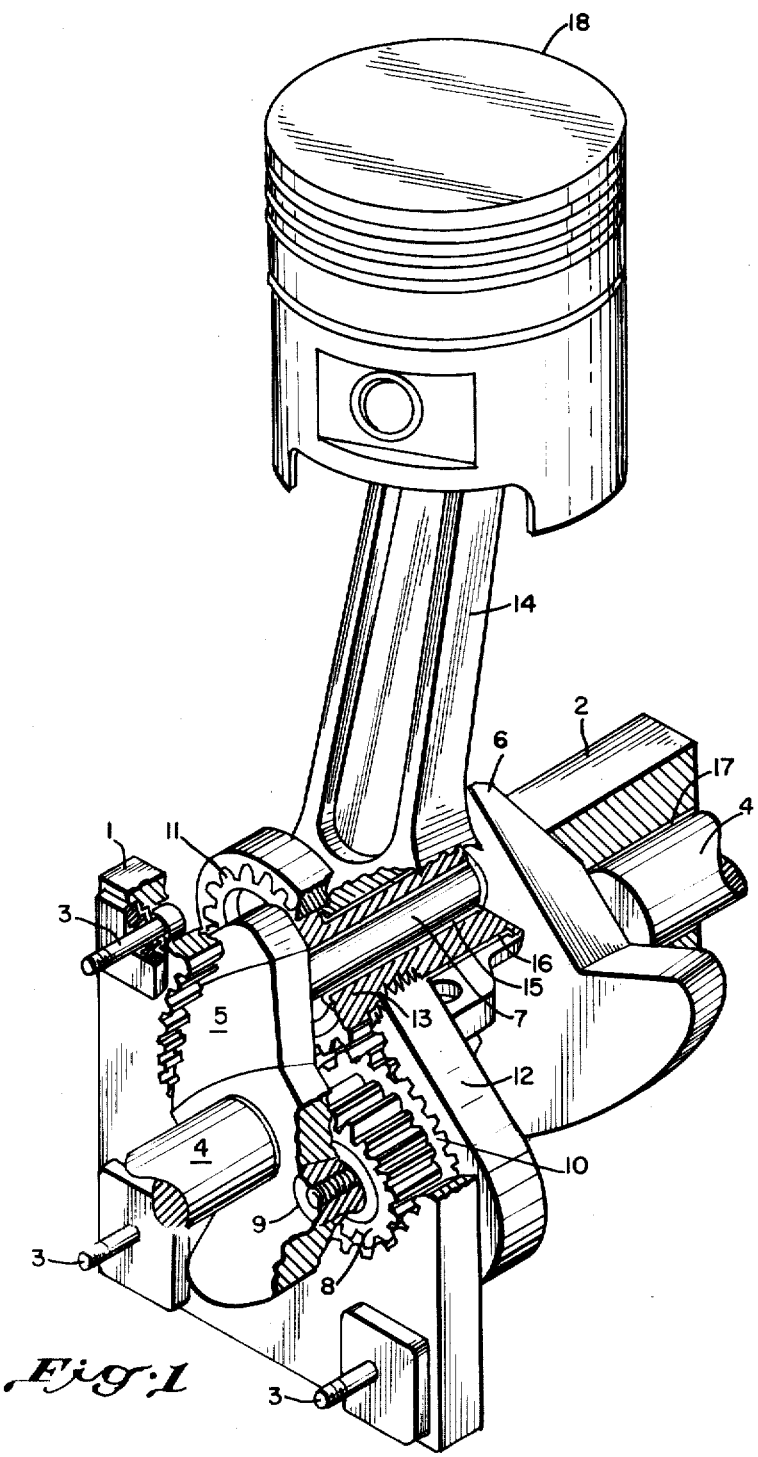
FIG. 1 is a perspective view of a section of a crankshaft having a plurality of such sections and showing in cutaway the gearing, belt drive and eccentric mechanism.
Figure 2:
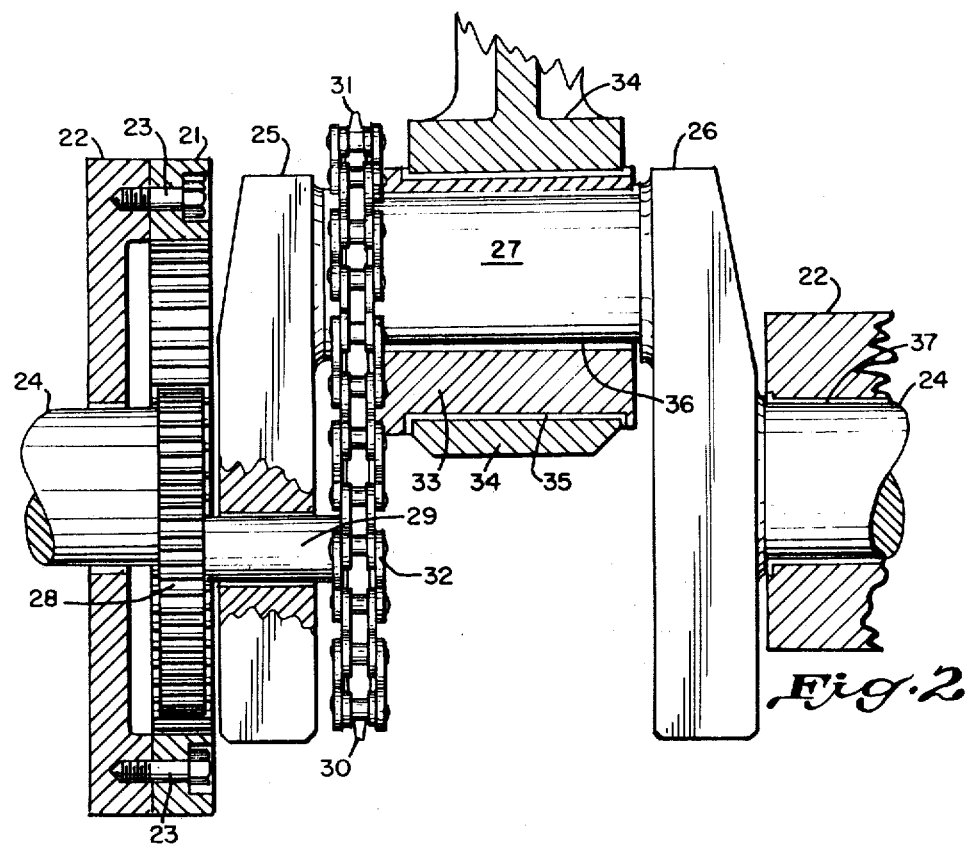
FIG. 2 is a view principally in vertical section showing a modification of the crank arm and using a sprocket gear and chain drive.

Considering first the mechanical operation of the system herein described and referring to FIG. 1. Gear 1 is a non-circular, internally toothed stationary gear and is firmly affixed to engine block 2 by bolts 3 and is centrally positioned over main journal shaft 4. Main journal 4 is axially aligned with a plurality of equally spaced similar shafts constituting the main bearing shafts of a single or multiple throw crankshaft which is journaled in bearing 17 in the engine block 2. Arms 5 and 6 are fixedly attached to their adjacent main journal shaft 4. Pin 7 is fixedly attached to arms 5 and 6 providing a solid link for transmitting a unison of motion to arms 5 and 6 as they revolve with main journal shaft 4. Gear 8 is a non-circular pinion gear engaged with its conjugate non-circular internally toothed gear 1. Arm 5 is bent above shaft 4 to provide an instep such that non-circular pinion gear 8 may operate on the inside of the crank span. Gear 8 is fixedly attached to one end of shaft 9 which is rotatably mounted in arm 5. A circular belt pully 10 is rotatably mounted on the other end of shaft 9 and is fixedly attached to non circular pinion gear 8. Circular belt gear 10 engages circular belt gear 11, rotatably mounted on pin 7, through gear belt 12. A cylindrical cam having an axial hole bored off center such as to form an eccentric 13 is rotatably mounted between pin 7 and piston connecting rod 14. Eccentric 13 is fixedly attached to gear belt pully 11. When gear belt pully 11 is made to rotate on pin 7 by the action of belt 12 it also causes eccentric 13 to rotate on pin 7 between bearings 15 and 16. Rotation of eccentric 13 on pin 7 causes piston connecting rod 14 to rise or fall relative to the revolution of pin 7. The motion imparted by eccentric 13 to connecting rod 14 and subsequently to piston 18 supplements (augments) the motion imparted by the rotation of the crankshaft to the piston 18. Piston speed may therefore be regulated in a manner which improves both the exhaust emission characteristics and the efficiency of the engine system. This is accomplished by causing the piston to rise on pin 7 against the combustion pressure during the power stroke. Pressure is therefore maintained above the piston until more effective crank angles are developed. This improves both the efficiency of the system and allows combustion to be carried out at leaner fuel mixtures which decreases the flame temperature and therefore decreases the amount of nitrogen oxides formed in the exhaust product. Referring now to FIG. 2. The mechaism shown in FIG. 2 is very similar to that shown in FIG. 1 with two exceptions.

1. The crank arm is not bent therefore the non-circular, internally toothed stationary gear 21 engages its non-circular pinion gear 28 outside of the crankspan.
2. A sprocket gear and chain drive system is employed instead of the gear belt pulley system to demonstrate the versatility of mechanical drive systems which may be employed.

Gear 21 is a non-circular internally toothed, stationary gear and is firmly affixed to engine block 22 by bolts 23 and is axially centered over main journal shaft 24. Main journal shaft 24 is axially aligned with a plurality of equally spaced similar shafts constituting the main bearing shafts of a single or multiple throw crankshaft journaled in bearing 37 in engine block 22. Arms 25 and 26 are fixedly attached to adjacent shafts 24. Pin 27 is fixedly attached to arms 25 and 26. Gear 28 is a non-circular pinion gear which is engaged with its conjugate non-circular internally toothed stationary gear 21. Non-circular pinion gear 28 is fixedly attached to one end of shaft 29 which is rotatably mounted in arm 25. Circular sprocket gear 30 is fixedly attached to the other end of shaft 29, sprocket gear 30 engages sprocket gear 31 through chain 32. Sprocket gear 31 is fixedly attached to eccentric 33. Both sprocket gear 31 and eccentric 33 are rotatably mounted on pin 7 between bearings 35 and 36. When the crankshaft is caused to revolve stationary non-circular gear 21 causes non-circular pinion gear 28 to rotate which in turn drives sprocket gear 30 through shaft 29 which in turn drives sprocket gear 31 through chain 32. Rotation of sprocket gear 31 on pin 27 causes the fixedly attached eccentric 33 to also rotate thereby controlling piston motion in the same manner as that described for FIG. 1.

Figure 3:
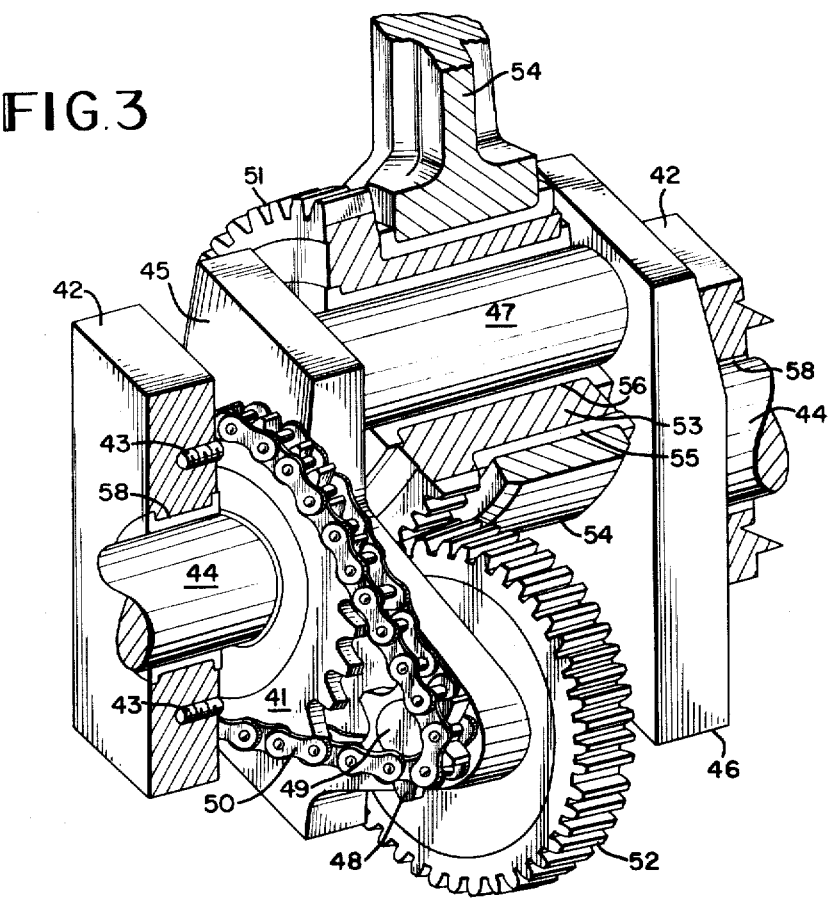
FIG. 3 is a perspective view of a section of the crankshaft showing another method of producing the desired rotation of the eccentric.

Referring to FIG. 3 Gear sprocket 41 is stationary and is firmly affixed to engine block 42 by bolts 43 and is centrally positioned over shaft 44. Shaft 44 is axially aligned with a plurality of equally spaced similar shafts constituting the main bearing shafts of a single or multiple throw crankshaft which is journaled in bearings 58 in the engine block 42. Arms 45 and 46 are fixedly attached to their adjacent shaft 44. Pin 47 is fixedly attached to arms 45 and 46 providing a unison of motion to arms 45 and 46 as they revolve with shaft 44. Gear-sprocket 41 is indirectly engaged with gear-sprocket 48 by belt-chain 50. Gear-sprocket 48 is fixedly attached to one end of shaft 49 which is adjustably journaled in arm 45. Non-circular gear 52 is fixedly attached to the other end of shaft 49 and is enmeshed with the teeth of non-circular gear 51. Non-circular gear 51 is fixedly attached to eccentric 53 which is rotatably mounted between bearings 55 and 56 which allows it to rotate freely between pin 47 and connecting rod 54 as the crankshaft revolves.

Figure 4:
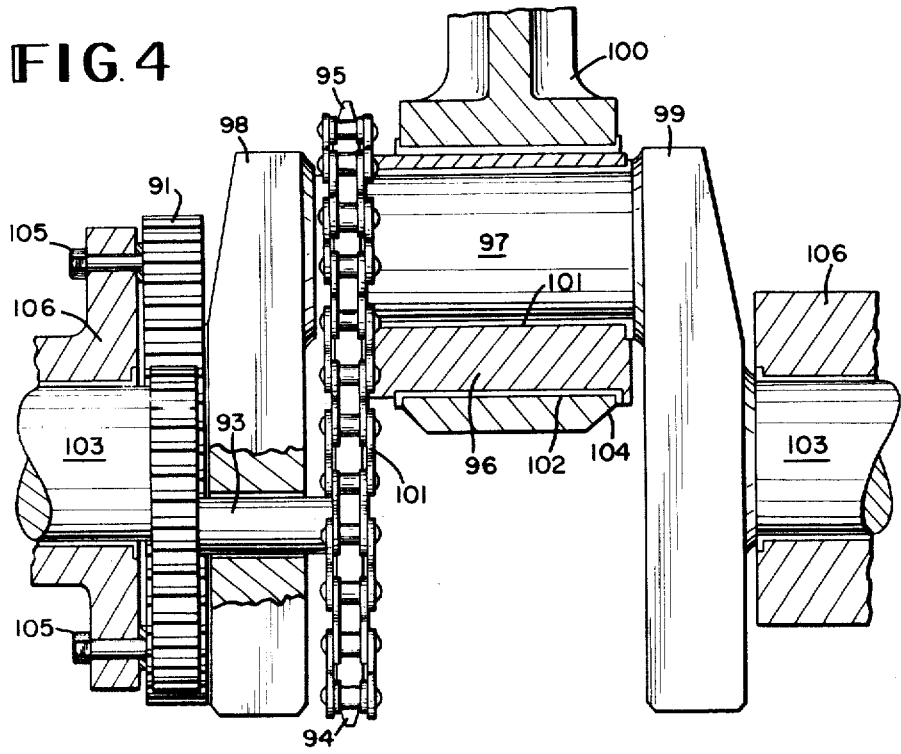
FIG. 4 is a view principally in vertical section showing an alternate method of gearing.

Referring to FIG. 4. Referring to FIG. 4, FIG. 4 is similar to FIG. 3 with the exception that the matching circular sprocket gear and the matching non-circular gear sets have been reversed. The beneficial effects of FIG. 4 are the same as those of FIG. 3. The operation of this system is as follows. Non-circular gear 91 is firmly affixed to engine block 106 by bolts 105 and is centrally positioned over shaft 103. Shaft 103 is axially aligned with a plurality of equally spaced similar shafts constituting the main bearing shafts of a single or multiple throw crankshaft which is journaled in the engine block 106. Arms 98 and 99 are fixedly attached to their adjacent shaft 103. Pin 97 is fixedly attached to arms 98 and 99 providing a solid link for transmitting a unison of motion to arms 98 and 99 as they revolve with shaft 103. Gear 92 is fixedly attached to one end of shaft 93 which is adjustably journaled in arm 98. Circular gear-sprocket 94 is fixedly attached to the other end of the shaft 93 and is indirectly engaged with gear-sprocket 95 through the linkage of belt-chain 101.

What is claimed is:

1. In an engine of the character described, an engine block, a plurality of axially aligned main journal shafts journalled in said engine block, an arm fixed on an end of each said main journal shafts, said arms fixedly attached in pairs between said main journal shafts by a pin, said pair of arms forming a crank span, a first arm of said crank span being bent to form an instep, a non-circular internally toothed gear vertically placed over said instep and fixedly attached to said engine block, a non-circular pinion gear rotatably mounted on the inside of said first arm opposite said instep and engaging the teeth of said non-circular internally toothed gear, a gear belt pulley fixedly attached to said non-circular pinion gear, a second gear belt pulley rotatably mounted on said pin and engaging the first named gear belt pulley by a gear belt, an eccentric rotatably mounted on said pin and fixedly attached to said second gear belt pulley, a connecting rod having one end connected to a piston and the other end journaled on the said eccentric for raising and lowering said piston upon said pin on rotation of the main journal shafts.

2. In engines of the character described, an engine block, first and second axially aligned main journal shafts in said engine block, an arm fixed on an end of each said main journal shafts, said arms fixedly attached in pairs between said main journal shafts by a pin to form a crank throw, a non-circular internally toothed gear centered over said first main journal shaft and fixedly attached to said engine block, a non-circular pinion gear fixedly attached to one end of a shaft rotatably mounted on said first arm of said crank throw and engaging the teeth of said non-circular internally toothed gear, said rotatably mounted shaft extending through said first arm opposite said pin and fixedly attached to a sprocket gear at the other end, a second sprocket gear rotatably mounted on said pin and engaging the first named sprocket gear by a sprocket chain, an eccentric rotatably mounted on said pin and fixedly attached to said second sprocket gear, a connecting rod having one end connected to a piston and the other end journalled on the said eccentric for raising and lowering the said piston upon said pin on rotation of said crank throw.

3. In engines of the character described, an engine block, first and second axially aligned main journal shafts journalled in said engine block, an arm fixed on an end of each said main journal shafts, said arms fixedly attached in pairs between said main journal shafts by a pin forming a crank throw, a non-circular gear centered over said first main journal shaft and fixedly attached to said engine block, a non-circular pinion gear fixedly attached to one end of a shaft rotatably mounted on one arm of said crank throw opposite said pin and engaging the teeth of the first named non-circular gear, said rotatably mounted shaft extending through said one arm and fixedly attached to a sprocket gear at the other end, a second sprocket gear rotatably mounted on said pin and engaging said first named sprocket gear by a sprocket chain, an eccentric rotatably mounted on said pin and fixedly attached to said second sprocket gear, a connecting rod having one end connected to a piston and the other end journalled on said eccentric for raising and lowering said piston upon said pin on rotation of said crank throw.

* * * * *